Jan. 19, 1926. 1,570,346
M. HAHN
STORAGE RECEPTACLE FOR SUBSTANCES EASILY DECOMPOSABLE IN SOLUTIONS
Filed March 28, 1923
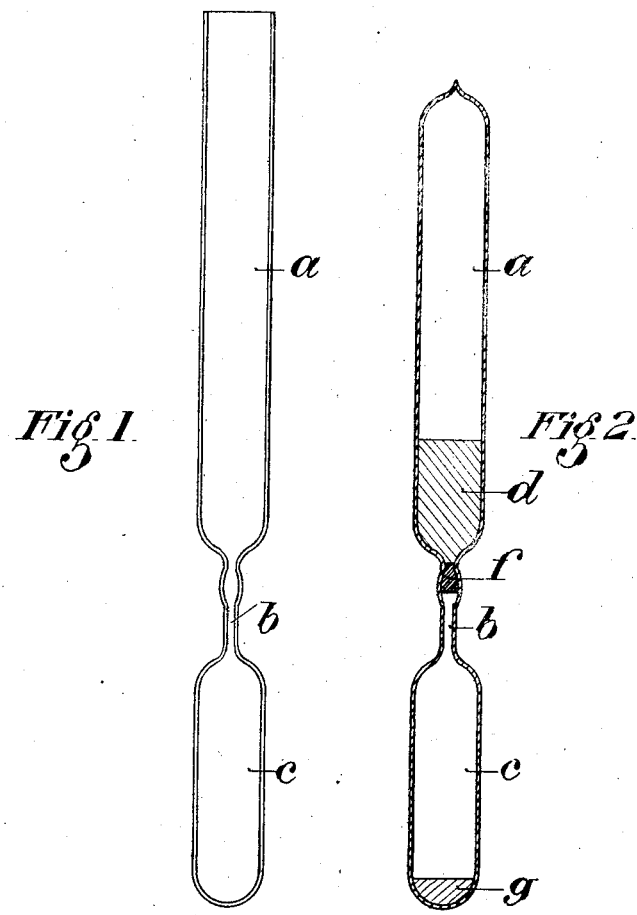

Patented Jan. 19, 1926.

1,570,346

UNITED STATES PATENT OFFICE.

MARTIN HAHN, OF BERLIN, GERMANY, ASSIGNOR TO M. WOELM A. G., OF SPANGEN-
BERG, GERMANY.

STORAGE RECEPTACLE FOR SUBSTANCES EASILY DECOMPOSABLE IN SOLUTIONS.

Application filed March 28, 1923. Serial No. 628,391.

*To all whom it may concern:*

Be it known that I, MARTIN HAHN, a citizen of the German Republic, and a resident of Berlin, Germany, have invented certain new and useful Improvements in Storage Receptacles for Substances Easily Decomposable in Solutions, of which the following is a specification.

This invention relates to a storage receptacle consisting of fusible material, for instance glass, which receptacle shall serve for storing in one and the same receptacle substances, the solutions of which decompose easily, separately from their solving medium and protected against being agitated, said receptacle offering the advantage that from the stored substance a sterile solution can be made in a simple manner at any time. Receptacles of this character are known and the novelty of the present invention consists in separating the two compartments of the receptacle by means of a capillary tube filled with an easily fusible material.

In the accompanying drawing, in which one form of construction of the subject matter of my invention is illustrated, Fig. 1 shows in side-view my improved receptacle before being filled and closed and Fig. 2 shows the receptacle in filled and closed condition.

In the illustrated receptacle two ampules on *a* and *c* are connected with each other by means of a capillary tube having a diameter of from one to three millimeters; said capillary tube can be expanded below the upper ampule in form of a slight enlargement.

The substance *g* is introduced through the open upper ampulla *a* and the capillary tube *b* into the previously dryly sterilized receptacle, so that said substance then rests within the lower ampule. Now a substance *f*, having a melting point between 50° and 100°, is introduced in molten condition into the capillary tube for the purpose of closing the latter. As such substances paraffine or preferably mixtures of paraffine with wax and resins or mixtures of resins and waxes are employed.

After the capillary tube has been closed and the closing medium *f* has solidified, the solving medium *d*, suited for the respective substance, as for instance water, physiological sodium chloride solution, or alcohol is introduced into the upper ampule in suitable quantities if required in sterilized condition, whereupon the free end of the upper ampule is closed by fusing.

For preparing the solution the lower ampule and the capillary tube are dipped into hot water for such a depth that the water reaches nearly the lower end of the upper ampule; thereby the stopper of paraffine or the like is loosened and flung upwardly. Then the liquid flows slowly through the open capillary tube in the lower ampule, while the latter is cooling, and dissolves the substance resting in said lower ampule.

When the solution is to be used the capillary tube is broken off from the lower ampule and the solution is now ready to be used, if required in sterilized condition.

In this manner sterile solutions of medicaments, dry sera and the like are ready to be used; solutions of sensitive reagents can be prepared at any time, even by unskilled persons.

I claim:

1. A sealed glass container comprising two individual ampules, containing respectively two substances of which the mixture is unstable in composition, a capillary glass tube connecting said two individual ampules with each other, and a closing medium made of a material fusible at a temperature between 45 and 100 degrees centigrade, arranged within said capillary glass tube.

2. A sealed glass container comprising two individual ampules, containing respectively two substances of which the mixture is unstable in composition, a capillary glass tube connecting said two individual ampules with each other, and a stopper made of a mixture of paraffin and wax arranged within said capillary glass tube.

In testimony whereof I affix my signature.

DR. MARTIN HAHN.